May 14, 1929.  C. C. WORTHINGTON  1,712,722
GANG LAWN MOWER
Filed July 18, 1921  2 Sheets-Sheet 1
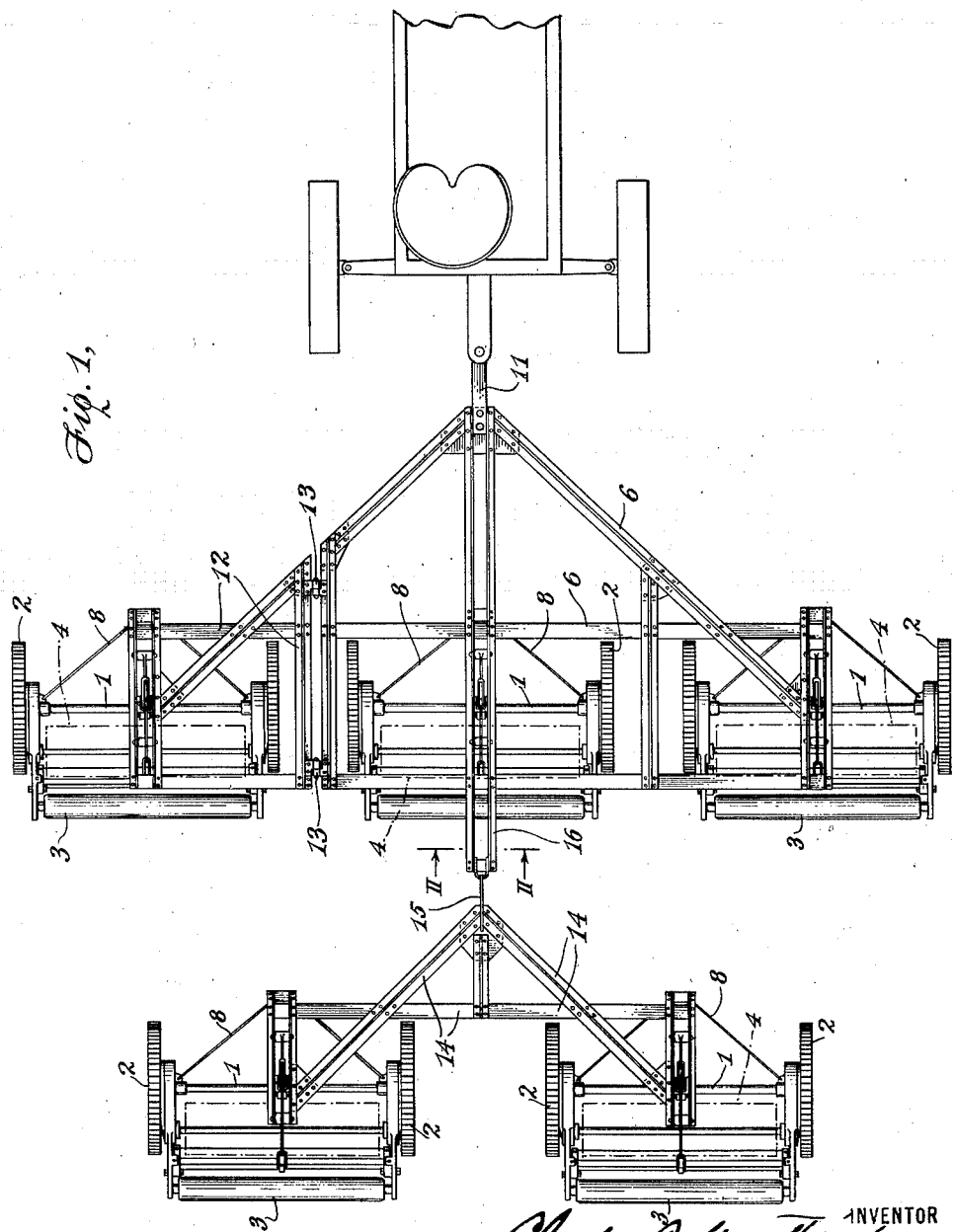

May 14, 1929. C. C. WORTHINGTON 1,712,722
GANG LAWN MOWER
Filed July 18, 1921 2 Sheets-Sheet 2
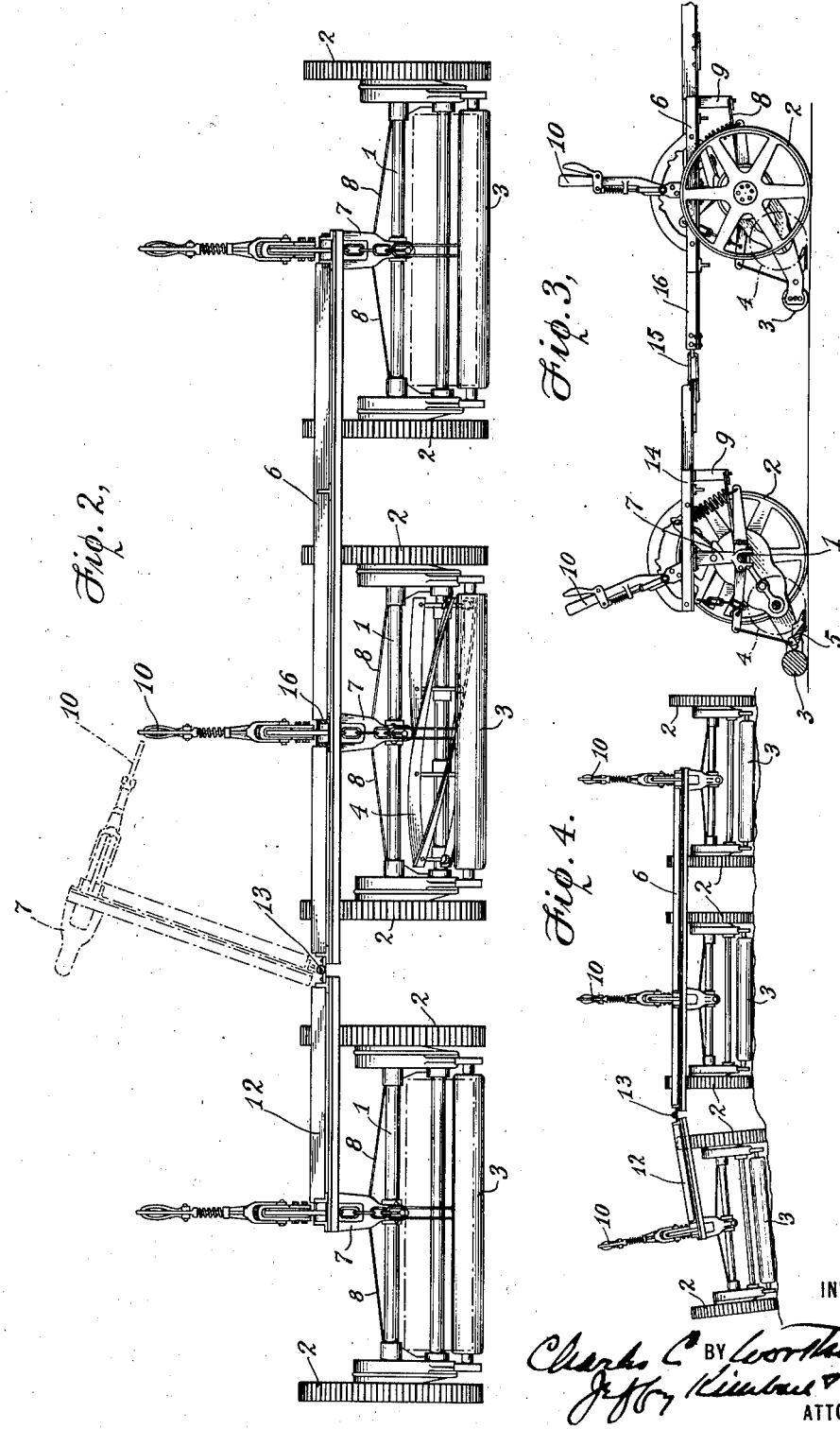
INVENTOR
ATTORNEYS Patented May 14, 1929.

1,712,722

UNITED STATES PATENT OFFICE.

CHARLES C. WORTHINGTON, OF DUNFIELD, NEW JERSEY.

GANG LAWN MOWER.

Application filed July 18, 1921. Serial No. 485,441.

The invention relates to gang lawn mowers having more than three lawn mower units and consists in the organization of the framework of such a gang whereby the several units are united and held in properly spaced relation with entire freedom to accommodate all manner of ground undulations and having other advantages. It also relates to principles of construction capable of use with advantage in gang lawn mowers generally as will hereinafter appear. To these ends the invention consists in the several features and combinations exemplified by the structure shown in the accompanying drawings and hereinafter pointed out in the appended claims.

In the said drawings:

Fig. 1, is a top plan of a five gang lawn mower representing the preferred embodiment of the invention.

Fig. 2, is a vertical section of Fig. 1 on line II—II.

Fig. 3, is a side elevation of Fig. 1 with parts in section.

Fig. 4, is a rear elevation of the front frame section resting on uneven ground.

The lawn mower units composing the gang may be understood to be identical in structure and each to be constituted of a unit frame including a cross bar 1 carried upon a pair of ground wheels 2 and a rear roller 3 and having a rotary fly-knife 4, indicated in dotted lines in some of the figures, which is driven by one or both of the ground wheels by means of gearing housed in the side members of the unit frame. The fly-knife co-operates with a fixed bed knife 5 and the rear part of the unit frame can rise and fall about the axis of the ground wheels. Lawn mower units of this type are well known in the gang lawn mower art. According to this invention, the units are assembled in several transverse rows or ranks, those in the rear serving to mow the spaces between or beyond the swaths mowed by those in front and one or more of said transverse rows is composed of more than two units. In the present case, of a five gang machine, there are two transverse rows with three units in the front row and two units in the rear row connected in trailing relation. The units of the three unit row are held together and in properly spaced relation to each other, by means of a framework, which comprises a plurality of sections or parts, connected together in such manner that they may move vertically with respect to each other, thereby permitting the units connected to them to operate on surfaces of different elevation and also so that the connected units will at all times be kept in alignment with each other, or so that their wheel-axes are always square to the longitudinal axis of the gang. The number of relatively movable frame sections or frame parts thus related depends on the number of units in the single row and, in the case in hand, the framework is composed of two sections, of which the one marked 6 is herein termed the main section inasmuch as it is in the central line of draft and sustains the draft strain of all the units in its row. This main section may be constituted of any suitable organization of frame bars such for example as that shown in the drawing, which will not require description. Such main section is directly connected to two of the lawn mower units of the row, and is shown as supported upon them by means of a post 7, which straddles the cross bar 1 of each unit, between collars at about its center, forming therewith a pivotal joint on which the units may tilt in the vertical plane of the axes of their own ground wheels: two frame links 8 connect the sides of each unit frame to the depending rigid link posts 9, so as to keep the unit at all times parallel to the transverse axis of the frame section and without interfering with the tilting movement nor with the rising and falling movement about the axis of the ground wheels above referred to. Immediately above each unit, the frame section carries the control mechanism for that unit which includes a hand lever 10 and other parts, as indicated in a general way in the drawings, whereby the bed knife or cutter mechanism, may be lifted and supported at a desired elevation from the ground and whereby also the spring shown may be caused to press the cutter mechanism toward the ground with an appropriately regulated pressure. This form of unit connection, and control mechanism, is identical with that described in my co-pending application—Serial No. 381,029 now Patent Number 1,607,378 granted November 16, 1926,—and forms no part of this invention, which is not concerned with the specific manner of adjusting the units.

The main frame section is provided with a draft link 11 or other suitable connection to any suitable gang-propelling means, indicated in Figure 1 as a tractor which draws the gang behind it.

The other section 12 at the left end of the main draft frame section is constructed in the present case of a shape and size, which is complementary to the design and general contour of the main frame section, for the sake of symmetry of appearance, but this is by no means necessary as will later appear. It is connected to the main section in the present case by a pivotal joint represented by two separate hinges 13—13 having a common pivotal axis, which axis is horizontal and substantially parallel to the gang travel. The separation of the two hinges in a fore and aft direction provides a long, longitudinal hinge base, which is desirable for maintaining the section 12 in rigid lateral alignment with the main section so that it constitutes in effect a lateral extension of the main frame section and is well adapted for sustaining the draft strain of the unit or units connected to it. This end section is provided with a bearing post 7, like the posts on the other section, by which it forms a tilt-permitting joint with the end unit of the row and it is also provided with a pair of frame links 8 and a link post 9, which hold the unit so that its wheel axis is always parallel to the transverse axis of the section, as well as with control mechanism all the same as supplied to the other units. All of the frame bars of the main frame section and all of those of the terminal section 12 are disposed substantially at or below the level of the tops of the ground wheels of the units and for this purpose the transverse frame bars of both sections are located in front and rear of the row of ground wheels and the longitudinal and oblique frame bars occupy spaces between the units or their wheels, the hinge joint 13 above referred to being thus situated between units and below the level of their wheel tops. This construction provides for a minimum weight of the frame work and specially for the location of the line of draft pull close to the level of the wheel axes, which is desirable for many reasons, while still permitting an adequate range of vertical movement for the wheels themselves.

In the operation of the three-unit frame above described, it will be plain on reference to Fig. 4, that each unit of the row is free to operate on ground at a different elevation from each of the others and may individually accommodate itself both to the lateral slope of the ground as well as to the slope of the ground in the direction of gang travel and that each unit is maintained for all conditions with both wheels in good tractive engagement with the ground and securely held in its proper position in the row and always square to the longitudinal axis of the gang. It will now be apparent also that the terminal frame section 12 is merely a means of connecting the terminal unit of the row to the main draft frame of the row so that it will always be square with the longitudinal axis of the gang while free to change its elevation and to tilt as required and it will be apparent that connecting means for this purpose is capable of wide variation as to its form, the number and arrangement of its component parts and its, or their, mode of attachment to the main frame and to the terminal unit and except as specified, in the appended claims there is no limitation herein to the use of a rigid frame section such as 12, for this purpose, and moreover, when such a frame section is used, there is no intended limitation to the use therewith of a hinge joint 13 arranged as above described and preferred, for the joint may be pivotal or otherwise so long as it will adapt the connecting means (between the main frame and the end unit) to occupy or assume different vertical positions with respect to said main frame while keeping the axis of the ground wheels of the end unit always square to the direction of gang travel. But by the use of the hinge joint 13, the frame section 12 can be very easily folded back over the other section, as indicated in dotted lines in Fig. 2, and with or without first detaching the unit thereby diminishing the width of the gang when it is desired to move it through narrow spaces, such as a barn doorway, and other advantages are inherent in the disposition of the joint in a longitudinal position and between the units in the manner described.

The special function of the main frame section 6, is to form the connection between the central draft link 11 and all the units of its row and while it is preferred to mount it on two of the units of its row, that will be recognized as merely one of the possible arrangements whereby it may serve this purpose. It is in any event superposed over or upon one or more of the units of its row and supported on an axis substantially coinciding with the normal axes of the ground wheels of such row, whether directly on one or more of them or on separate wheels is immaterial provided the ground wheels of all those units which do not serve to support the draft frame section are each connected to it by connecting means, which connecting means can change its vertical position with reference to said draft frame while keeping such unit always square to the longitudinal axis of the gang.

The lawn mower units of the rear row are connected to the front framework in overlapping relation to the front units in any suitable way, and by preference, they are organized in a common frame 14 which is connected by a hook or clevis joint 15 to a rearwardly extending tail piece 16 on the main frame section 6. Each of the two units in the rear row is connected to the common frame 14 by means of the bearing post construction already described in connection with the other units and has the same or equivalent control mechanism whereby the relation of these units to the common frame is exactly the same as that of the front units to the front frame and the manipulation of them is identical. Moreover, the frame bars constituting the rear frame are located in substantially the same horizontal level as the front frame, so that the frame work of the whole assemblage is low and close to the level of all of the ground wheel axes. The clevis connection between the front and rear frames of the gang framework and the fact that the front framework is of the sulky type, i. e. supported in its normal position by its flexible link draft connection, permits the front and rear frames to assume different angles in vertical longitudinal planes, as well as in vertical transverse planes and horizontal planes, thereby adapting the gang to operate properly on every kind of lawn surface when turning curves as well as when mowing straightaway. It will be understood that so far as the organization of the units in the rear row is concerned, they may also be connected to and spaced by an articulate frame, like the front framework if desired, and especially if such row contains more than two units and it is quite immaterial whether the row of smaller number of units be front or rear. While I have above assumed the lawn mower units each to be mounted in a pair of ground wheels, it will be understood that such wheels may, if preferred, be substituted by roller, where a rolling effect is desired, and that in referring to the ground wheels in the following claims, it is intended to include thereby both kinds of rolling elements.

Claims:

1. A gang lawn mower comprising a plurality of transverse rows of lawn mower units having rotary cutters and ground wheels, one of said rows containing more than two units, a main draft frame for said transverse row superposed over the same and serving to sustain the draft of all the units in said row and means in non-supporting relation to said draft frame for connecting thereto one of the units of said row and holding said unit with the axis of its wheels square to the longitudinal axis of the gang.

2. A gang lawn mower comprising a plurality of transverse rows of lawn mower units having cutter-driving ground wheels, one of said rows containing more than two units, a main draft frame for said row superposed over the same and sustaining the draft of all the units in said row, a pivotal connection between said frame and the propelling means adapting it to assume different horizontal angles with reference thereto, and means in non-supporting relation to said draft frame for connecting one of the units of said row thereto and holding said unit with its axis square to the longitudinal axis of the gang.

3. A gang lawn mower comprising a plurality of transverse rows of lawn mower units having rotary cutters and ground wheels, one of said transverse rows containing more than two units, a main draft frame for that row composed of horizontal cross bars disposed in front and rear of said row and at or below the level of the tops of the ground wheels thereof and means in non-supporting relation to said frame for connecting one of the lawn mower units to it and adapted to hold said unit with the axis of its ground wheels at all times parallel to said frame cross bars.

4. A gang lawn mower comprising a plurality of transverse rows of lawn mower units having cutter-driving ground wheels, one of said rows containing more than two units, a main draft frame for said transverse row carried on certain of the ground wheels of said row and sustaining the draft strain of all the units in said row and means in non-supporting relation to said frame for connecting thereto one of the units of said row and arranged to hold said unit with its ground wheels parallel to the ground wheels of all the other units of the row.

5. A gang lawn mower comprising a plurality of transverse rows of lawn mower units having rotary cutters and ground wheels, one of said rows containing more than two units, a main sulky type draft frame for said transverse row superposed over the same and having a flexible or link-type draft connection to support it in operating position and means in non-supporting relation to said sulky frame for connecting thereto one of the units of said row and holding said unit with the axis of its ground wheels at all times substantially parallel to the cross-members of said frame.

6. A gang lawn mower comprising a plurality of transverse rows of lawn mower units having rotary cutters and ground wheels, one of said rows containing more than two units, a frame carried on certain of the units of said row, and a flexible connection between said frame and another unit of said row, said unit being in non-supporting relation to said frame.

7. In a gang lawn mower, the combination of more than two lawn mower units forming a single transverse row of the gang, frame sections uniting and spacing the units of that row, and longitudinally-disposed joint means connecting the adjacent marginal portions of said sections adapted to permit the units thereof to operate on different ground elevations.

8. A gang lawn mower having more than two lawn mower units arranged in a transverse row, a framework uniting and spacing the units of said row comprising two adjacent frame sections connected together by a longitudinally extended pivotal joint the axis whereof is parallel with the direction of gang travel and a pivotal joint directly connecting each unit with one of said sections.

9. A gang lawn mower comprising more than two lawn mower units having cutter-driving ground wheels disposed in a single transverse row, and an articulate framework spacing and uniting the units of that row, the pivotal axis of the articulate connection between sections of said framework being located substantially at or below the level of the tops of said ground wheels.

10. A gang lawn mower comprising more than two lawn mower units arranged in a single transverse row and having cutter-driving ground wheels, and laterally adjacent frame sections spacing and uniting the units of that row, the sections being joined by front and rear flexible connections permitting a unit connected to one frame section to operate at a different level from a unit connected to the adjacent section.

11. A gang lawn mower comprising more than two lawn mower units in a single transverse row, an articulate framework uniting and spacing said units and having the axes of its pivotal joint or joints disposed between adjacent units and at or below the level of the tops of their ground wheels.

12. A gang lawn mower comprising a transverse row of lawn mower units having cutter mechanism and ground wheels, a framework uniting and spacing the units of said row and hinge means connecting adjacent parts of said framework and co-related therewith to permit one part to be folded over toward the other part thereby diminishing the horizontal dimension of the mower.

13. A gang lawn mower comprising a plurality of rows of lawn mower units with more than two units in one of said rows and a folding framework for said row comprising frame sections and hinge means connecting the same.

14. In a gang lawn mower, a main frame having unit-holding means extending laterally therefrom and connected in non-supporting and horizontally rigid relation to said main frame and adapted to move relatively to said frame about an axis extending in the general direction of travel, a lawn mower unit supported on the ground, and means connecting said unit in supporting relation to said holding means and permitting it to tilt relatively to said holding means about an axis extending in the direction of travel.

15. In a gang lawn mower, a main frame having a lateral extension, means connecting said extension in non-supporting relation to said main frame and adapted to permit said extension to move relatively to said frame about an axis extending in the general direction of travel, a lawn mower unit having ground wheel and cutter mechanism, and means connecting said unit to said extension, holding said unit square with the direction of travel and permitting it to tilt in a vertical transverse plane relatively to said extension.

16. In a gang lawn mower, a main frame having unit-holding means extending laterally therefrom, and connected in non-supporting and horizontally rigid relation thereto and adapted to move relatively to said frame about an axis extending in the general direction of travel, a lawn mower unit comprising a ground wheel and cutter mechanism, and means connecting said holding means to said unit adapted to hold the latter square to the direction of travel while permitting said cutter mechanism to swing about the axis of said ground wheel and tilt in vertical transverse planes.

17. A gang lawn mower, comprising a plurality of lawn mower units having ground wheels, and arranged in front and rear positions, a frame associated with a transverse row of said units and having a lateral extension, means connecting said extension in non-supporting and horizontally rigid relation to said frame adapted to permit said extension to move vertically relatively to said frame; certain of the lawn mower units of said row being connected to said frame by means permitting tilting in a vertical transverse plane relatively to said frame and one of the units of said row being connected to said lateral extension by means permitting tilting thereof in a vertical transverse plane relatively to said extension.

18. A gang lawn mower comprising front and rear rows of lawn mower units, a draft frame for each row, means connecting said frames adapted to permit them to assume different horizontal angles, one of said frames comprising sections united at their proximate marginal portions by means holding them horizontally rigid but free to move vertically with respect to each other, and means connecting one of the units of said row to one of the frame sections thereof adapted to permit said unit to tilt in a vertical transverse plane relatively to said frame section.

19. A gang lawn mower comprising a plurality of transverse rows of lawn mower units having rotary cutters and ground wheels, one of said rows containing more than two units, a main draft frame section for said transverse row superposed over the same and serving to sustain the draft of all the units in said row, means in non-supporting relation to said draft frame section for connecting thereto one of the terminal units of said row and holding said unit with the axis of its ground wheels square to the longitudinal axis of the gang, said means including provisions permitting said unit to move about a longitudinal axis, means connecting the other terminal unit of said row to said draft frame section adapted to permit said latter unit to move about a longitudinal axis relatively to said frame section, and joint means between said section and the units of the other row permitting the latter to assume varying horizontal angles with reference thereto while maintaining overlapping relation to the first mentioned units.

20. A gang lawn mower comprising a plurality of transverse rows of lawn mower units having rotary cutters and ground wheels, one of said rows containing more than two units, a sulky type draft frame for said transverse row superposed over the same and having a flexible or link-type draft connection to support it in operating position, and means in non-supporting relation to said draft frame for connecting thereto a terminal unit of said row and holding said unit with the axis of its ground wheels square to the direction of travel and permitting said unit to tilt about a longitudinal axis relatively to said draft frame, in combination with flexible joint means connecting the units of the adjacent row to said draft frame in overlapping arrangement with respect to the first mentioned units.

21. In a gang lawn mower, the combination of more than two lawn mower units forming a single transverse row of the gang, frame sections uniting and spacing the units of that row, longitudinally-disposed joint means connecting the adjacent marginal portions of said sections adapted to permit the units thereof to operate on different ground elevations, means for connecting each terminal unit to its frame section adapted to permit such unit to tilt with reference to said section about an axis extending in the direction of travel, another transverse row of units arranged in overlapping relation to the first mentioned units and joint means between the units of the front row and the units of the rear row arranged to permit the latter units to assume varying horizontal and vertical angles with reference to the front row while maintaining said overlapped relation.

22. A gang lawn mower having more than two lawn mower units arranged in a transverse row, a frame-work uniting and spacing the units of said row including two adjacent frame sections connected together by a longitudinally extended pivotal joint, the axis whereof is parallel with the direction of gang travel, and means directly connecting a unit of said row to each of said sections said means permitting such units to tilt on axes extending in the direction of travel and other units held in overlapping relation to the units of said row.

23. A gang lawn mower comprising more than two lawn mower units having rotary cutters and ground wheels in a single transverse row, an articulate framework uniting and spacing the units of that row, the pivotal axis of the articulate connection between sections of said framework being located substantially at or below the level of the tops of said ground wheels and the means forming the connection between the terminal units of the row and said framework being adapted to permit them to tilt relatively thereto on individual longitudinal axes.

24. A gang lawn mower comprising more than two lawn mower units in a single transverse row, an articulate framework uniting and spacing said units and having the axis of its pivotal joint or joints extending longitudinally of the gange between adjacent units and at or below the level of the tops of their ground wheels, means for connecting the terminal units to said framework adapted to permit them to tilt about longitudinal axes relatively thereto and other transverse units in overlapping relation to the units of said row.

25. A gang lawn mower comprising a plurality of rows of lawn mower units, each having cutter-driving ground wheels, with more than two such units in one of said rows, a folding framework for said row comprising frame sections with hinge means connecting the same together, and connecting means between sections and units permitting the latter to tilt on longitudinal axes relatively to such sections.

26. In a gang lawn mower, a main draft frame structure having unit-holding means extending laterally therefrom and connected in non-supporting and horizontally rigid relation to said main frame and adapted to move relatively to said frame structure about an axis extending in the direction of travel, a lawn mower unit supported on the ground, and means connecting said unit in supporting relation to said holding means and permitting it to tilt relatively to said holding means about an axis located below the tops of the ground wheels of said unit and extending in the direction of travel.

27. A gang lawn mower comprising a transverse row of lawn mower units having cutter mechanism driven by ground wheels and cross rods substantially coinciding with the axes of said wheels, a framework uniting and spacing the units of said row and rotatably connected to the cross-rods thereof and hinge means connecting adjacent parts of said framework and co-related therewith to permit one part to be folded over toward the other part thereby diminishing the horizontal dimension of the mower.

28. A gang lawn mower comprising more than two lawn mower units arranged in a single transverse row and having cutter-driving ground wheels, and laterally adjacent frame sections spacing and uniting the units of that row, the sections being joined by flexible connections permitting a unit connected to one frame section to operate at a different level from a unit connected to the adjacent section and tilt relatively to its section on an axis extending in the direction of travel, and means on each section adapted to sustain the cutter mechanism of its unit elevated from the ground.

29. A gang lawn mower comprising, in combination, a plurality of transverse rows of lawn mower units having rotary cutters and ground wheels, one of said rows containing more than two units, a sulky type draft frame for said transverse row provided with a flexible or link-type draft connection to support it in erect position, means in non-supporting relation to said sulky draft frame for connecting thereto a terminal unit of said row, said means holding said unit with the axis of its ground wheels square to the direction of travel and permitting it to tilt about a longitudinal axis relatively to said draft frame, means for connecting the other terminal unit of said row to said frame adapted to permit said unit to tilt about a longitudinal axis independently of the other units, and flexible link draft means for the units of the adjacent row holding the same in overlapping arrangement with respect to the first mentioned units and unrestrained as respects individual tilting on longitudinal axes.

30. A gang lawn mower comprising, in combination, a plurality of transverse rows of lawn mower units having rotary cutters and ground wheels, one of said rows containing more than two units, a sulky type draft frame provided with a tractor draft connection to support it in erect position for mowing, means for connecting a terminal unit of said row to said sulky draft frame adapted to hold said unit with the axis of its ground wheels square to the direction of travel and permit it to tilt about a longitudinal axis relatively to said draft frame, means for connecting the other terminal unit of said row to said draft frame adapted to permit said unit to tilt about a longitudinal axis independently of the other units, means on the rear of said sulky frame for the attachment thereto of the units of the rear row, said attachment means providing freedom to said units to turn in horizontal planes in reference to said draft frame and tilt in the vertical planes of their own wheel axes.

31. A gang lawn mower comprising a plurality of transverse rows of overlapping lawn mower units having cutter-driving ground wheels, one of said rows containing more than two units, uniting and spacing means for all of the units comprising a front draft frame section and auxiliary frame sections connected thereto by flexible joint means permitting them to move up and down with reference to and independently of said front section and each other, and means connecting said sections to said units permitting the latter to tilt, individually with reference to the respective sections to which they are connected on axes extending in the direction of travel.

32. A gang lawn mower comprising a plurality of transverse rows of lawn mower units having cutter-driving ground wheels, one of said rows containing more than two units, uniting and spacing means for said gang of units comprising a draft frame section and auxiliary frame sections connected thereto by means permitting them to move up and down with reference to and independently of said draft section, in combination with means connecting said sections to said units permitting the latter to tilt individually with reference to the sections to which they are connected on axes extending in the direction of travel, and individual means for holding the cutter mechanism elevated for each unit, mounted on said sections.

33. A gang lawn mower comprising a plurality of transverse rows of lawn mower units having cutter-driving ground wheels, one of said rows containing more than two units, uniting and spacing means for all of the units comprising a draft frame section supported on a unit, and auxiliary frame sections also supported on units and connected to said draft section by means permitting them to move up and down with reference thereto and independently thereof, the means connecting said sections to said units permitting the latter to tilt individually with reference to the sections to which they are connected on axes extending in the direction of travel.

34. A gang lawn mower comprising a plurality of transverse rows of lawn mower units having cutter-driving ground wheels, one of said rows containing more than two units, uniting and spacing means for said gang of units comprising a front frame section provided with a draft connection by which it is supported in erect position, and auxiliary frame sections connected thereto by means permitting them to move up and down with reference to said front section, the means connecting said sections to said units permitting the latter to tilt, individually with reference to the sections to which they are connected on axes extending in the direction of travel, and means mounted on said sections individual to each unit for controlling the elevation of the cutter mechanism thereof.

35. A gang lawn mower comprising a plurality of transverse rows of lawn mower units having cutter-driving ground wheels, one of said rows containing more than two units, uniting and spacing means for all of the units comprising a frame section provided with a tractor draft connection and rigid auxiliary frame sections connected thereto by flexible joint means permitting them to move up and down with reference to and independently of said section and each other, and means connecting said sections to said units holding the latter square to the direction of travel but permitting them to tilt, individually, with reference to the respective sections to which they are connected on axes extending in the direction of travel.

In testimony whereof, I have signed this specification.

CHARLES C. WORTHINGTON.